Nov. 8, 1927.
T. P. ROTH
1,648,825
TUBE AND TIRE SAVING DEVICE
Filed Nov. 8, 1926   2 Sheets-Sheet 1
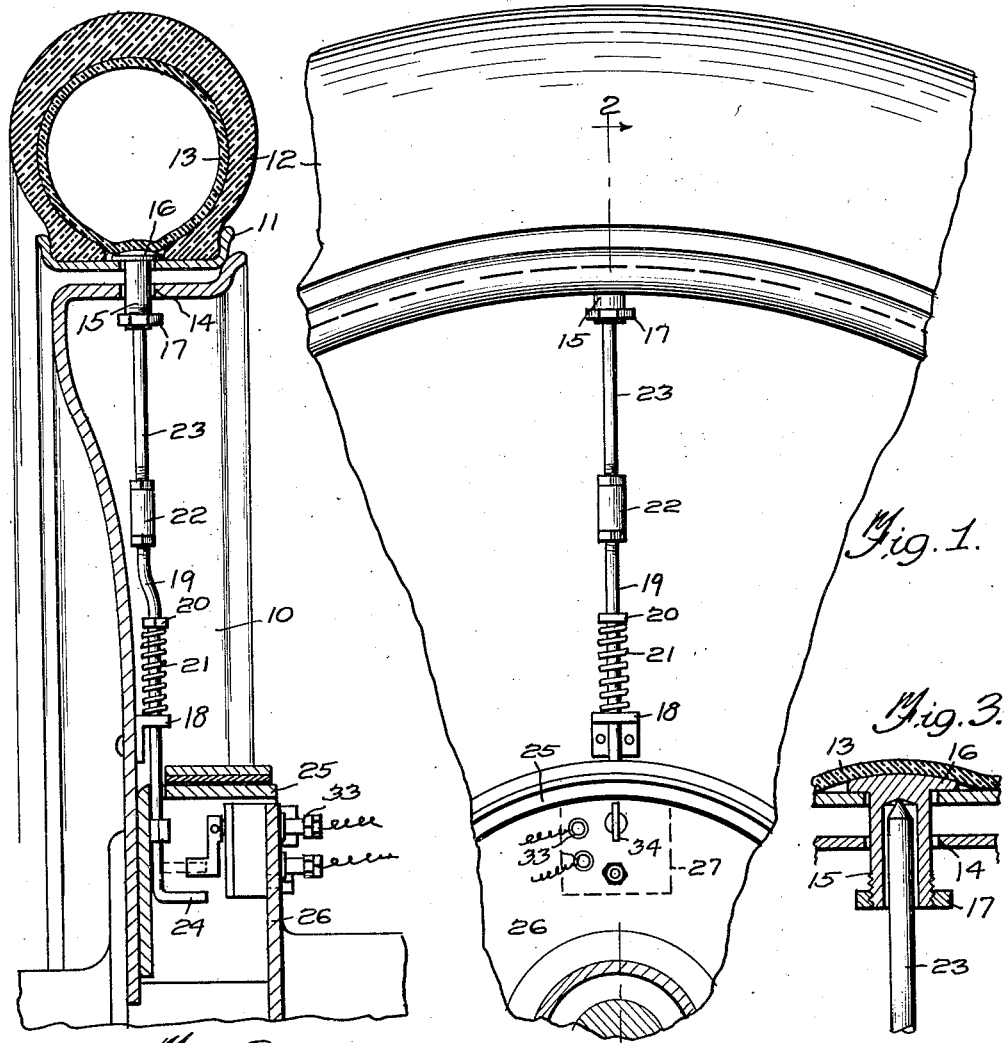
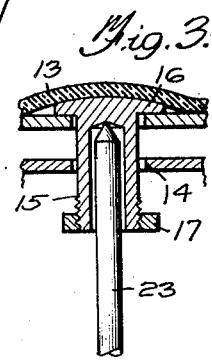
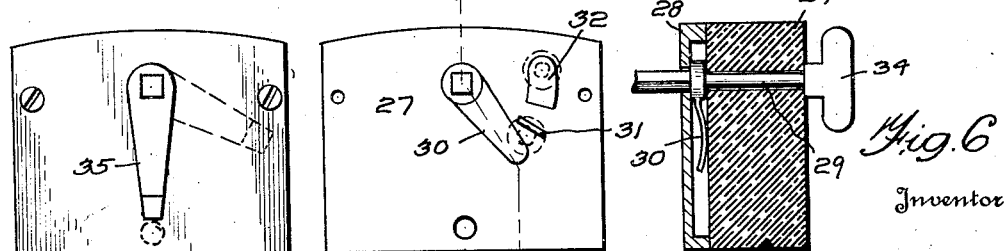
Inventor
T. P. Roth

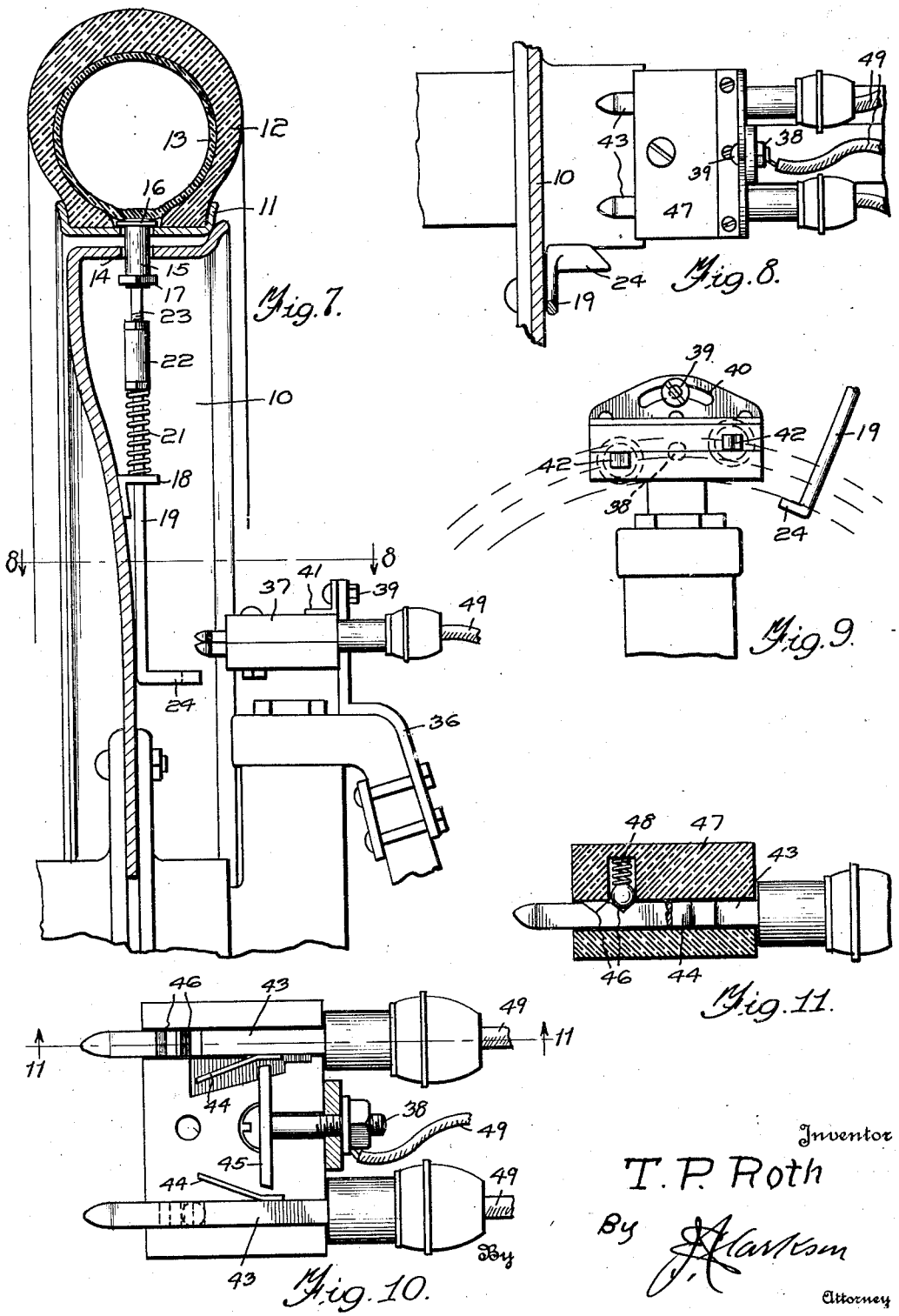

Patented Nov. 8, 1927.

1,648,825

UNITED STATES PATENT OFFICE.

THOMAS P. ROTH, OF LOUISVILLE, KENTUCKY.

TUBE AND TIRE SAVING DEVICE.

Application filed November 8, 1926. Serial No. 147,157.

This invention relates to tube and tire savers of the type shown in my co-pending application for patent, Serial No. 100,135, filed April 6, 1926, and has special reference to improvements in the circuit closers and means for operating the same as shown and described in the aforesaid co-pending patent.

One important object of the invention is to provide an improved circuit closing arrangement for use in devices of this description, and wherein primary and secondary circuits are successively closed.

A second important object of the invention is the provision of an improved device, controlled by the degree of inflation of a pneumatic tire and which, under deflation of the tire, will effect operation of the improved circuit closer.

With the above and other objects in view as will be hereinafter apparent, the invention consists in general of certain novel details of construction and combinations of parts hereinafter fully described, illustrated in the accompanying drawings, and specifically claimed.

In the accompanying drawings like characters of reference indicate like parts in the several views, and:

Figure 1 is a side elevation of a portion of an automobile wheel, partly in section, and showing one form of the device.

Figure 2 is a section on the line 2—2 of Figure 1, the view being partly in elevation.

Figure 3 is an enlarged detail section on the line 2—2 of Figure 1 and showing the tire contacting end of the push rod.

Figure 4 is an enlarged face view of the form of contact device shown in Figure 1.

Figure 5 is a view of this contact device with the cover plate removed.

Figure 6 is a section on the line 6—6 of Figure 5.

Figure 7 is a view similar to Figure 2 but showing a second form of contact device.

Figure 8 is a section on the line 8—8 of Figure 7.

Figure 9 is a detail view of the parts shown in Figure 8 looking from the left of that figure.

Figure 10 is a view somewhat similar to Figure 8 but to an enlarged scale and with the cover plate of the casing removed.

Figure 11 is a section on the line 11—11 of Figure 10.

In illustrating the device there has been shown a wheel having the ordinary center 10, demountable rim 11, tire casing 12 and inner tube 13. The rim and felloe of the wheel in each case are provided with openings 14 wherethrough extends a movable tubular member 15 having a head 16 bearing against the inner part of the tube 13. This member is also provided with a lock nut 17 to prevent loosening of the member. Secured to the wheel itself is a bracket 18 which may be of any desired form, this bracket being variable to suit different types of automobile wheels. Through this bracket extends a push rod 19 carrying an adjusting nut 20 which serves to adjust the tension of a spring 21 urging the push rod outwardly. This push rod is jointed as at 22 so that different lengths of its outer portion 23 may be used in accordance with different diameters of wheels. The end of this outer portion 23 enters the tubular member 15 and bears against the bottom of the opening or recess therein. The inner end of this rod is provided with an angled striker portion 24 which, in the form shown in Figure 2, extends into the brake drum 25. Fixed on the cover flange 26 within the brake drum is a casing having a base 27 of insulating material and being also provided with a cover plate 28 of similar material. Extending through the base 27 is a shaft 29 carrying a contact arm 30 which traverses a pair of spaced contacts 31 and 32 fixed to the base 27 and connected to binding posts 33 on the exterior of the brake drum cover. The shaft 29 extends through this cover and is provided with a setting key 34. The other end of this shaft is squared and carries an L-shaped rocker arm 35 engageable by the striker 24 as the push rod moves outwardly under the influence of the spring 21 overcoming the resistance due to the pressure in the tube 13.

In this form as the tube partially collapses the arm 30 will first engage contact 31 giving timely warning that the tube needs attention through suitable signaling circuits such as are shown in my co-pending patent. If this warning is not heeded the arm 30 will then engage the second contact 32 upon further collapse of the tire and notify the driver that immediate attention must be given his tire to save it from destruction.

In the form shown in Figures 7 to 11 a different contact arrangement is made though the push rod arrangement is practically the same. However, in order to illustrate that it is not necessary to house the contact in a brake drum there has been shown in Figure 7 a bracket 36 which is secured to some suitable fixed part of the automobile and mounted on this bracket is a casing 37 which is pivoted to the bracket by a contact screw 38 and secured in adjusted position angularly with respect to the bracket by a bolt 39 passing through an arcuate slot 40 formed in a small bracket 41 secured to one part of the casing 37. The casing is made with two similar halves and in each half there is provided a slot 42 wherein is slidably mounted a contact bar 43 carrying a contact finger 44 which, when the bar moves in one direction, engages a head or fixed contact 45 on the screw 38. Each of these bars 43 is provided with a pair of notches 46 which are engaged by a ball 47 pressed into the notches by a spring 48. By this construction the bar may be held in either protruded or retracted position. These bars and the screw 38 are connected by suitable wiring 49 to a proper alarm system such as that previously referred to.

In this case as the tube 13 collapses and the push rod moves outwardly the striker 24 engages one of the protruding ends of the bars 43 and pushes that bar downwardly to make contact between its spring finger 44 and fixed contact 45. If no attention is paid to the tire and the tube continues to collapse the striker 24 will move further outwardly and similarly actuate the other bar 43. The degree of collapse between the first and second warnings may be regulated by tilting the casing 37 and securing the same in tilted position by the bolt 39, and it will be noted that in any case one of the bars 43 is more remote from the axis of the wheel than the other in order to effect the two successive closings of circuits.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a tire deflation alarm, a circuit closer adapted to be connected with a fixed part of an automobile and including a pair of contacts and a third contact, the pair of contacts and the third contact being relatively movable to effect successive engagement between the contacts of the pair and the third contact, said relative movement further effecting successive disengagement of the contacts after engagement thereof, a bracket adapted for support on an automobile wheel, a rod having at one end a head engageable with the inner tube of a tire on said wheel, a spring for holding said head constantly pressed against said inner tube, and a striker carried by said rod and arranged to effect the successive engagements of said contacts.

2. In a tire deflation alarm, a circuit closer adapted to be connected with a fixed part of an automobile and including a pair of contacts and a third contact, the pair of contacts and the third contact being relatively movable to effect successive engagement between the contacts of the pair and the third contact, said relative movement further effecting successive disengagement of the contacts after engagement thereof, a bracket adapted for support on an automobile wheel, a rod having at one end a head engageable with the inner tube of a tire on said wheel, a spring for holding said head constantly pressed against said inner tube, means to vary the tension of said spring, and a striker carried by said rod and arranged to effect the successive engagements of said contacts.

3. A circuit closer for tire deflation alarms comprising a casing having a pair of guide slots extending therethrough in staggered relation and adapted to be secured to a fixed part of an automobile adjacent a wheel with one slot more remote from the wheel axis than the other, circuit closing elements slidable in and projecting from said slots, and a striker adapted to be carried by the wheel and to move radially thereof under the influence of pressure in a wheel tire, said striker being positioned to engage first one and then the other of said elements and move them to circuit closing position.

4. A circuit closer for tire deflation alarms comprising a casing having a pair of guide slots extending therethrough in staggered relation and adapted to be secured to a fixed part of an automobile adjacent a wheel with one slot more remote from the wheel axis than the other, circuit closing elements slidable in and projecting from said slots, a striker adapted to be carried by the wheel and to move radially thereof under the influence of pressure in a wheel tire, said striker being positioned to engage first one and then the other of said elements and move them to circuit closing position, and spring latch devices engaging the elements and holding them releasably in projected and retracted positions.

5. A circuit closer for tire deflation alarms including an insulating casing having a pair of parallel guide slots extending therethrough, conductor bars slidable in said slots to protruded and retracted positions, a fixed contact positioned between said bars in said casing, spring contact fingers each carried by a respective bar and movable into and out of engagement with the fixed contact upon retraction and protrusion of said bars, said bars having each a pair of spaced notches, spring pressed balls in said casing engageable in the notches to hold the bars releasably in protruded and retracted position, means to attach the casing adjustably to a fixed post of an automobile adjacent a wheel with the bars at different distances from the wheel axis, and a striker adapted to be carried by the wheel and to move radially thereof for successive engagement with the bars upon protrusion thereof.

In testimony whereof I affix my signature.

THOMAS P. ROTH.